(12) United States Patent
Rossetti et al.

(10) Patent No.: US 12,356,242 B2
(45) Date of Patent: Jul. 8, 2025

(54) SYSTEMS AND METHODS FOR DYNAMIC FRONTHAUL GATEWAY

(71) Applicant: Verizon Patent and Licensing Inc., Basking Ridge, NJ (US)

(72) Inventors: David Albert Rossetti, Randolph, NJ (US); Anand J. Shah, Parsippany, NJ (US); Madhusudan Mandyam Bheemarayan, Hillsborough, NJ (US); Sylvestre Demonget, Millburn, NJ (US); Anush Gift Isaac, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 510 days.

(21) Appl. No.: 17/931,977

(22) Filed: Sep. 14, 2022

(65) Prior Publication Data

US 2024/0089794 A1 Mar. 14, 2024

(51) Int. Cl.
*H04W 28/02* (2009.01)

(52) U.S. Cl.
CPC ............................. *H04W 28/0289* (2013.01)

(58) Field of Classification Search
CPC .................................................. H04W 28/0289
See application file for complete search history.

(56) References Cited

U.S. PATENT DOCUMENTS

| | | | | |
|---|---|---|---|---|
| 11,838,169 B1 * | 12/2023 | Sudletsky | ........... | H04L 41/0613 |
| 2021/0377801 A1 * | 12/2021 | Noriega | ................ | H04W 88/14 |
| 2022/0053465 A1 * | 2/2022 | Redlich | ................ | H04L 5/0005 |
| 2022/0078123 A1 * | 3/2022 | Lin De Medeiros | ... | H04L 47/32 |
| 2022/0385577 A1 * | 12/2022 | Kim | ........................ | H04L 47/12 |
| 2023/0262481 A1 * | 8/2023 | Ke | ........................ | H04W 16/28 370/329 |
| 2023/0292175 A1 * | 9/2023 | Kong | .................... | H04W 28/06 |
| 2024/0023028 A1 * | 1/2024 | Nikopour | .............. | G06N 3/045 |
| 2024/0063851 A1 * | 2/2024 | Sachidanand Sinha | ..................... | H04B 7/0628 |
| 2024/0172003 A1 * | 5/2024 | Nakazato | .............. | H04W 24/02 |
| 2024/0196315 A1 * | 6/2024 | Nakazato | .............. | H04W 16/24 |
| 2024/0334305 A1 * | 10/2024 | Ahmavaara | .......... | H04W 40/246 |

FOREIGN PATENT DOCUMENTS

| | | | | |
|---|---|---|---|---|
| EP | 4066395 B1 * | 4/2024 | ............. | H04B 7/024 |
| WO | WO-2023164480 A1 * | 8/2023 | ........... | H04L 5/0048 |

* cited by examiner

*Primary Examiner* — Mehmood B. Khan

(57) ABSTRACT

A system described herein may serve as an interface between one or more radio units ("RUs") of a wireless network and one or more Distributed Units ("DUs") of the RAN. The system may maintain information associating a set of RUs with a particular DU. The system may determine that a particular RU of the set of RUs should be disassociated from the particular DU, such as based on load metrics associated with the particular DU exceeding one or more thresholds. The system may disassociate the particular RU from the particular DU by modifying the information associating the set of RUs with the particular DU. The modified may indicate that the particular RU is no longer associated with the particular DU. The system may accordingly facilitate communications between the modified set of RUs, not including the particular RU, and the particular DU.

20 Claims, 15 Drawing Sheets

SYSTEMS AND METHODS FOR DYNAMIC FRONTHAUL GATEWAY

BACKGROUND

Wireless network providers may offer services such as wireless communication services, routing services, traffic processing services, or the like to User Equipment ("UEs") such as mobile telephones, Internet of Things ("IoT") devices, etc. Wireless network infrastructure such as radios, antennas, etc. may be deployed in geographical locations such that UEs are able to wirelessly communicate with such wireless network infrastructure and obtain wireless connectivity. Some radio access network ("RAN") architectures may include a separation of radio equipment such as antennas, radio units ("RUs"), etc. that send and receive wireless signals, and baseband processing units (e.g., distributed units ("DUs")) that convert wireless signals (e.g., analog waveforms) to digital data (e.g., bitstreams) or vice versa. The communication between RUs and DUs may be referred to as "fronthaul" communications.

DETAILED DESCRIPTION OF EXAMPLE EMBODIMENTS

Figure 1:
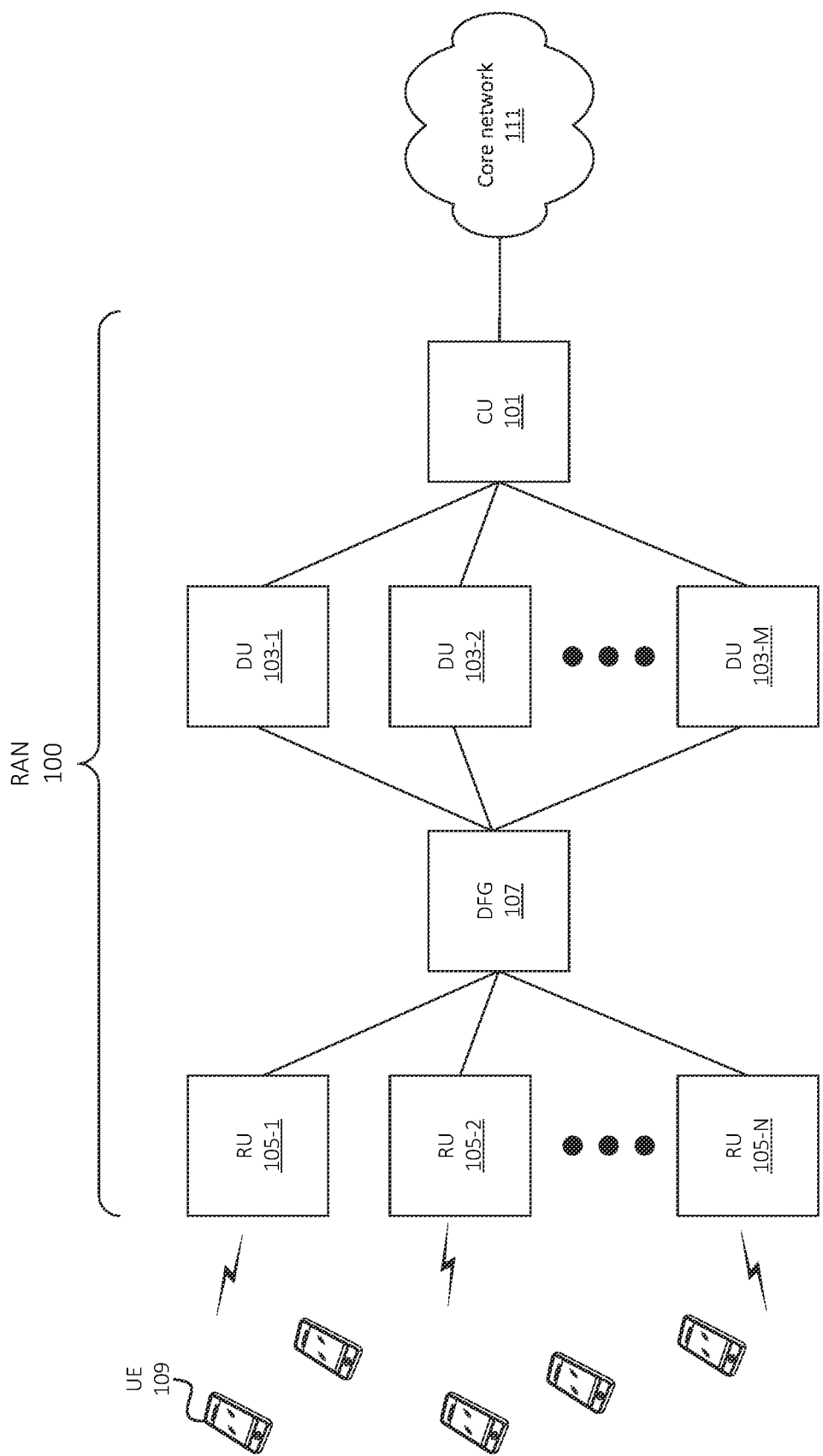
FIG. 1 illustrates an example architecture of one or more embodiments described herein.

The following detailed description refers to the accompanying drawings. The same reference numbers in different drawings may identify the same or similar elements.

Embodiments described herein provide for a dynamic fronthaul gateway ("DFG") that facilitates the communication between one or more baseband processing units (e.g., DUs) of a RAN and radio elements of the RAN (e.g., RUs). For example, a DU may implement a cell or other logical portion of the RAN, and may be communicatively coupled to multiple RUs. The RUs communicatively coupled to the DU may wirelessly implement "copies" of the cell, such that UEs that wirelessly communicate with any of the RUs may detect that the UEs are connected to the particular cell associated with the DU, regardless of which RU the UEs are connected to.

As discussed herein, the DFG of some embodiments may facilitate the dynamic reassignment of RUs and DUs, such that an RU that implements a first cell (e.g., associated with a first DU) may instead implement a second cell (e.g., associated with a second DU). The dynamic reassignment may be based on, for example, a determination that a given DU is overloaded, that a given DU is underutilized, and/or based on other suitable factors. Further, in some embodiments, the DFG may be implemented as a separate device or system than the RUs and the DUs. In this manner, RUs that are already deployed may not need to be modified, reconfigured, etc.

Such situations may occur, for example, when RUs are deployed in physical locations such as within an office building, a sports stadium, a train station, etc., and demand for wireless service at a particular location that corresponds to a particular RU increases. For example, demand for wireless service may increase during particular times of day (e.g., an RU that is proximate to a cafeteria may experience relatively high demand or load during lunch time), may increase due to building layout changes (e.g., a water cooler may be moved into the coverage area of a particular RU, and individuals may congregate in such coverage area), may increase during the occurrence of events (e.g., a sports game at a sports stadium), etc. The increased demand for wireless service at a given RU may correspondingly increase the processing load of a DU that is communicatively coupled to the RU. The dynamic reassignment of RUs to DUs, in accordance with embodiments described herein, may allow for UEs to continue to receive wireless service in such situations with low or no user experience degradation, without requiring physical reconfiguration, rewiring, etc. of DUs and/or RUs.

Further, the implementation of the DFG as a separate device from the DUs may allow for flexibility in the selection or deployment of particular DUs, as the DFG of some embodiments allows for the DUs to be communicatively coupled to any number of RUs. That is, such DUs may need only a single hardware interface (e.g., a single Network Interface Card ("NIC"), a single port, a single cable, etc.) to communicate with the DFG, and the DFG may include suitable interfaces to communicate with multiple RUs. In this manner, DUs that are already deployed may be able to communicate with the DFG of some embodiments without physical modifications or reconfiguration.

FIG. 1 illustrates an example architecture of some embodiments. As shown, RAN 100 may be implemented by or may include Central Unit ("CU") 101, one or more DUs 103 (e.g., DUs 103-1 and 103-2, in this example), and one or more RUs 105 (e.g., RUs 105-1 through 105-N, in this example). In some embodiments, RAN 100 may be, may include, or may be implemented by an O-RAN architecture. RUs 105 may send and/or receive wireless signals (e.g., radio frequency ("RF") signals) to and/or from UEs 109, which may include, may be integrated in, may be communicatively coupled to, and/or may otherwise be associated with mobile telephones, manufacturing robots, drones, autonomous vehicles, sensors, IoT devices, etc. DUs 103 may perform baseband processing, such as analog-to-digital conversion (e.g., for downlink traffic received from one or more RUs 105), digital-to-analog conversion (e.g., for uplink traffic to be sent via one or more RUs 105), and/or other suitable operations. CU 101 may perform higher layer processing, such as assembling Packet Data Convergence Protocol ("PDCP") packets or other types of packets based on lower layer traffic (e.g., Radio Link Control ("RLC")) received from DUs 103, and may provide such higher layer traffic to core network 111 (e.g., to a User Plane Function ("UPF") of core network 111 or other type of gateway, device, system, etc. that handles application layer traffic). Similarly, CU 101 may receive application layer packets from core network 111, may generate RLC packets or other suitable lower level traffic based on the received traffic from core network 111, and may provide the lower level traffic to one or more DUs 103 for wireless transmission by one or more associated RUs 105.

Figure 2:
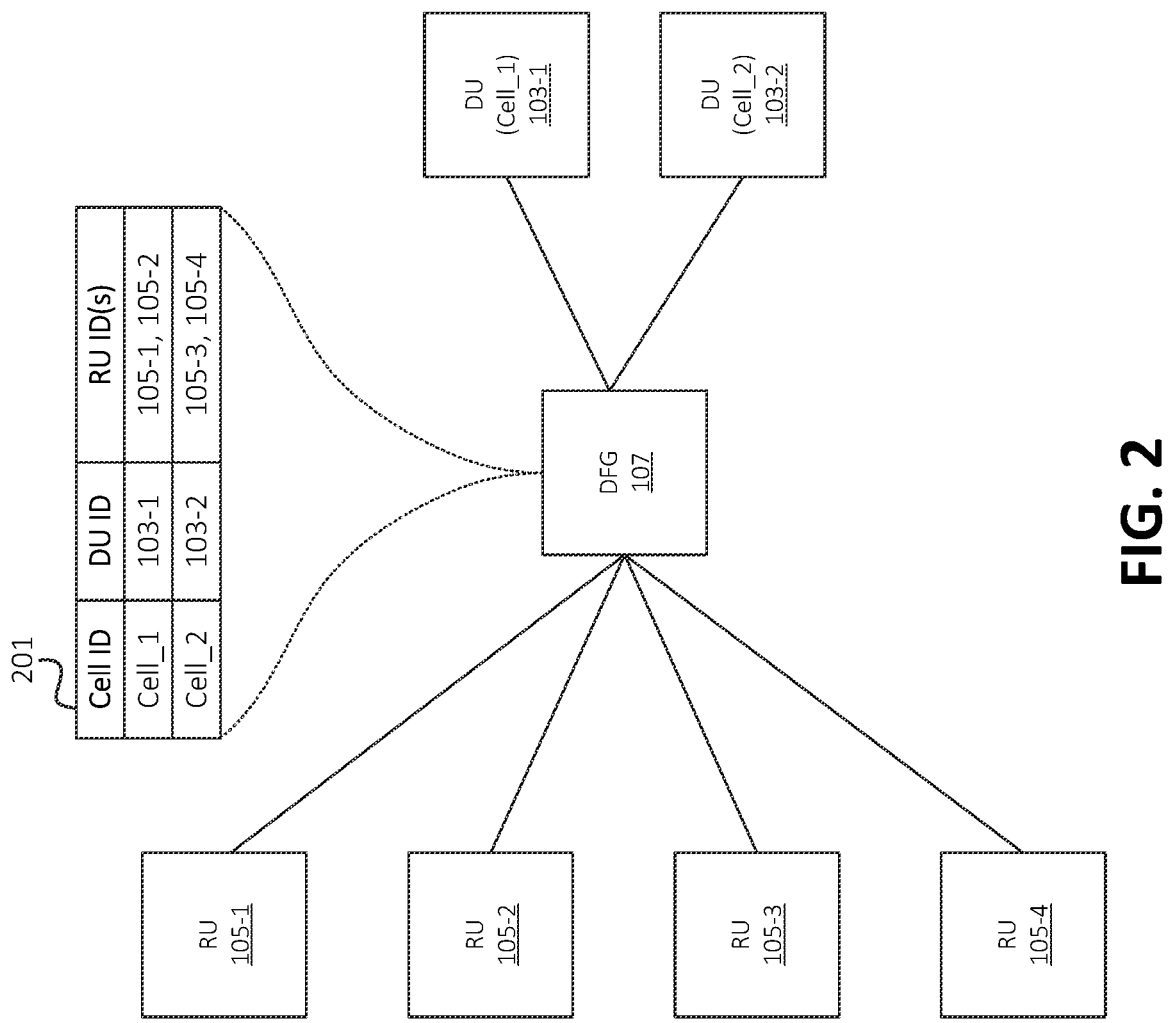
FIGS. 2 and 3 illustrate an example association between cells, RUs, and/or DUs, in accordance with some embodiments.

In accordance with some embodiments, RAN 100 may include DFG 107, which may serve as an interface between one or more DUs 103 and one or more RUs 105. For example, as shown in FIG. 2, DFG 107 may maintain data structure 201, which may indicate particular RUs 105 that are associated with particular DUs 103 and/or associated cells. In some embodiments, each DU 103 may be associated with a respective cell identifier, represented as "Cell_1" for DU 103-1 and "Cell_2" for DU 103-2, in this example. In practice, other identifiers may be used to represent cells, DUs 103, and RUs 105 in data structure 201, such as Evolved Universal Mobile Telecommunications Service ("UMTS") Terrestrial Radio Access Network ("UTRAN") Cell Global Identifiers ("ECGIs"), New Radio ("NR") Cell Global Identities ("NCGIs"), Internet Protocol ("IP") addresses, container identifiers, or other suitable identifiers.

In some embodiments, DFG 107 may receive some or all of the information maintained in data structure 201 from DUs 103. For example, DUs 103 may indicate a respective cell with which DUs 103 are associated, and/or may indicate one or more RUs 105 with which such DUs 103 are associated. For example, in some embodiments, DFG 107 and/or DUs 103 may implement one or more application programming interfaces ("APIs"), protocols, interfaces, etc. whereby DU 103 is able to send one or more messages to DFG 107, indicating such information. For example, such APIs, protocol, interfaces, etc. may include or may implement one or more fronthaul links between DU 103 and DFG 107. Additionally, or alternatively, DFG 107 may receive some or all of the information maintained in data structure 201 from some other source, such as an orchestration platform, a management console, a portal, a graphical user interface ("GUI"), a configuration file, and/or some other suitable source. In some embodiments, DFG 107 may receive the information from a simulation platform or some other source that uses artificial intelligence/machine learning ("AUML") techniques or other suitable modeling techniques to determine and provide the information associating cells, DUs 103, and/or RUs 105. Thus, in some embodiments, a particular DU 103 may be involved in the procedure of registering and/or associating the particular DU 103 with a respective cell and/or set of RUs 105. Additionally, or alternatively, one or more DUs 103 may be "unaware" of DFG 107. For example, such DUs 103 may be connected to DFG 107 via a physical interface, but may not perform any specific messaging that is directed to DFG 107 in order to provide information maintained in data structure 201.

Figure 3:
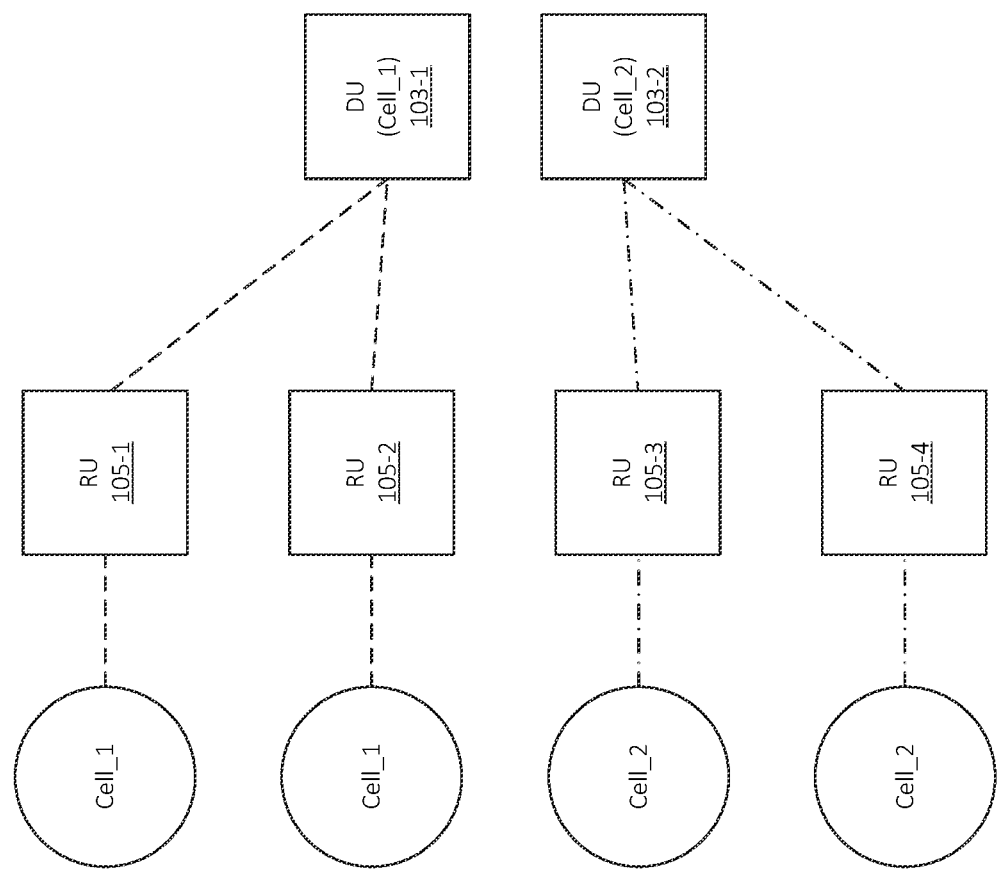

In some embodiments, each DU 103 may be associated with one or more RUs 105. The association of each DU 103 with one or more RUs 105, as indicated by data structure 201, may denote that such RUs 105 are instances of the cell, are copies of the cell, or otherwise together implement the particular cell associated with each DU 103. FIG. 3 conceptually illustrates an example of the associations between cells, DUs 103, and RUs 105 indicated in data structure 201. As shown in FIG. 3, DU 103-1 may logically be associated with Cell_1, and may also be associated with RUs 105-1 and 105-2. As such, information maintained by DFG 107 (e.g., data structure 201) may indicate that RUs 105-1 and 105-2 implement Cell_1. Similarly, DU 103-2 may logically be associated with Cell_2, and may also be associated with RUs 105-3 and 105-4. As such, information maintained by DFG 107 (e.g., data structure 201) may indicate that RUs 105-3 and 105-4 implement Cell_2.

Figure 4:
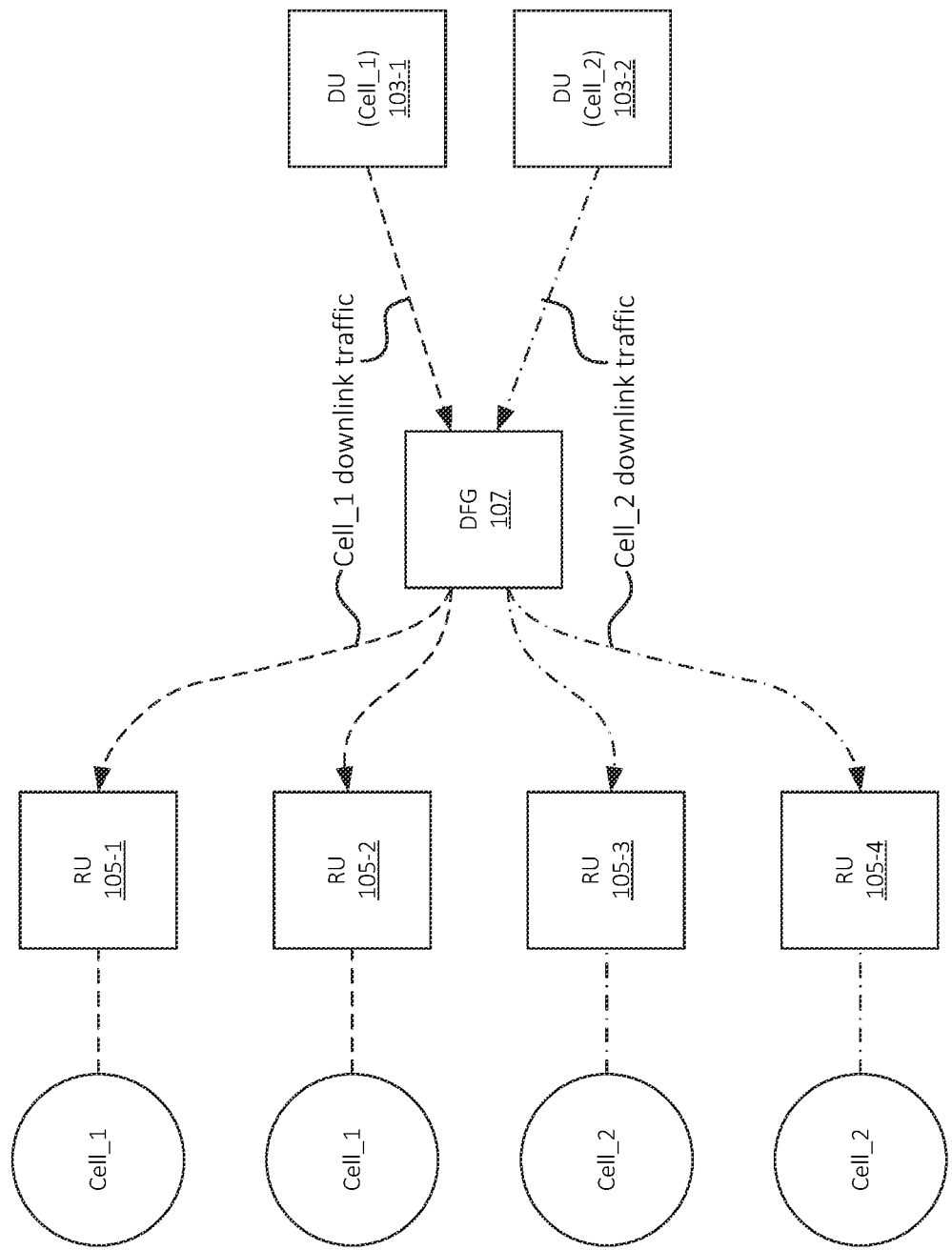
FIGS. 4 and 5 illustrate an example of forwarding uplink and downlink traffic between respective RUs and DUs, in accordance with some embodiments.

In maintaining such information, DFG 107 may be able to multiplex, de-multiplex, route, forward, etc. traffic (e.g., including providing timing information, sequencing information, synchronization information, etc. for such traffic) associated with respective cells between RUs 105 and the appropriate DU 103 for such traffic. For example, as shown in FIG. 4, DFG 107 may receive (e.g., via a fronthaul link, an Enhanced Common Public Radio Interface ("eCPRI") interface, or some other suitable interface) downlink traffic from DU 103-1. Based on the information maintained by data structure 201, DFG 107 may identify that since the downlink traffic was received from DU 103-1, that the downlink traffic is associated with Cell_1. DFG 107 may further identify, based on the information maintained in data structure 201, that RUs 105-1 and 105-2 are associated with Cell_1, and may forward the traffic to RUs 105-1 and 105-2.

Although the term "forward" is used here to refer to downlink traffic, DFG 107 may perform further processing on the downlink traffic, such as performing digital-to-analog conversion, Quality of Service ("QoS") treatment, baseband processing, or other suitable operations prior to forwarding the traffic (e.g., a processed version of the traffic) to RUs 105-1 and 105-2. Further, the downlink traffic may include traffic which may ultimately be wirelessly transmitted by RUs 105-1 and 105-2 (e.g., user plane traffic and/or control plane signaling between respective UEs 109 and one or more elements of RAN 100 and/or core network 111) and/or RAN management plane traffic, such as RU configuration instructions (e.g., beamforming instructions or other suitable instructions) provided by DU 103-1, some or all of which may have been received by DU 103-1 from a CU 101 to which DU 103-1 is communicatively coupled, or some other source.

Since RUs 105-1 and 105-2 are both associated with Cell_1, the downlink traffic (e.g., processed traffic) forwarded to RUs 105-1 and 105-2 may be copies of the same traffic. In this manner, UEs that are within the coverage area of either RU 105-1 or 105-2 (or both) may be able to detect the presence of wireless signals associated with Cell_1. Similarly, DFG 107 may receive traffic from DU 103-2, identify that the traffic is associated with Cell_2, and may forward the traffic (e.g., a processed version of the traffic) to RUs 105-3 and 105-4, which are also associated with Cell_2.

Figure 5:
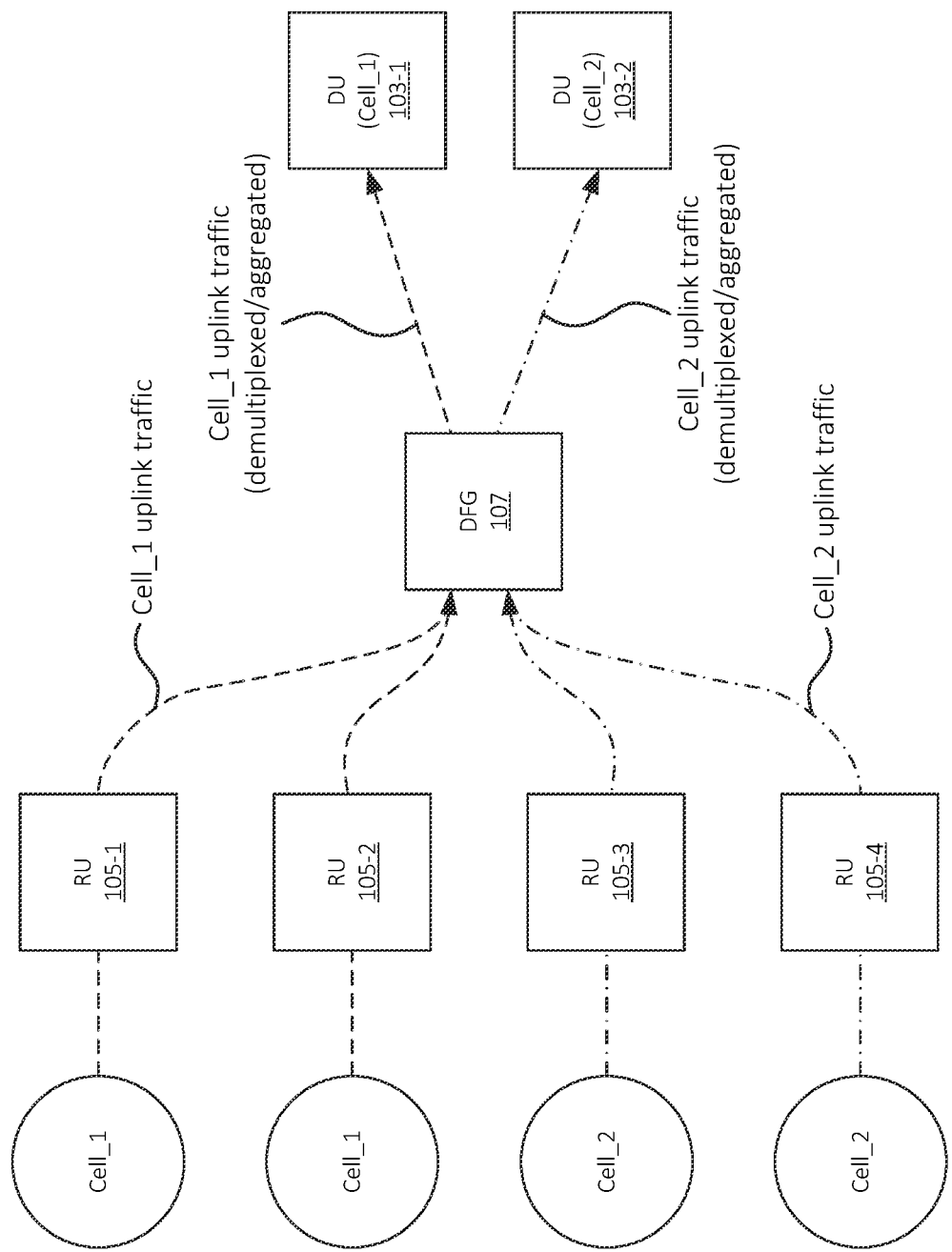

As shown in FIG. 5, in the uplink direction, DFG 107 may receive uplink traffic from RUs 105. For example, one or more RUs 105 may output traffic received from one or more UEs 109 that are wirelessly connected to RUs 105. As similarly noted above, the traffic received from the one or more UEs 109 may be user plane traffic destined for a user plane element of core network 111 (e.g., a UPF), or management plane traffic destined for one or more management plane elements of RAN 100 and/or core network 111 (e.g., an Access and Mobility Management Function ("AMF") and/or some other device, system, or network function). Additionally, or alternatively, the uplink traffic may include RAN management plane signaling, such as monitoring or diagnostic messages from RUs 105 to associated DUs 103. Such control plane signaling may include, for example, performance and/or load metrics, such as amount of used and/or available throughput or other RF resources over a given time window, a quantity of connected UEs 109 over a given time window, error and/or acknowledgement messages, and/or other suitable signaling.

DFG 107 may determine, based on the information maintained in data structure 201, that uplink traffic received from RUs 105-1 and 105-2 is associated with Cell_1, and therefore should be forwarded to DU 103-1, which is also associated with Cell_1. Although the term "forward" is used here to refer to the uplink traffic, DFG 107 may perform further processing on the uplink traffic prior to outputting such traffic to DU 103-1. For example, DFG 107 may perform a de-multiplexing operation, an analog-to-digital conversion operation, an error correction operation, baseband processing, and/or other suitable operations or processing, and may forward the processed traffic to DU 103-1. Similarly, DFG 107 may receive uplink traffic from RU 105-3 and/or 105-4, identify that such traffic is associated with Cell_2, process the traffic, and forward the processed traffic to DU 103-2.

DFG 107 may be "transparent" to DUs 103 and RUs 105, at least in the context of forwarding traffic, as discussed above with respect to FIGS. 4 and 5. For example, DFG 107 may be communicatively coupled to DUs 103 and RUs 105 via one or more physical interfaces, without DUs 103 and RUs 105 needing to communicate with DFG 107 for the purposes of routing traffic. In this manner, DUs 103 may output traffic in the same format, using the same protocols, etc. as if DUs 103 were communicating directly with RUs 105. Similarly, RUs 105 may output traffic in the same format, using the same protocols, etc. as if RUs 105 were communicating directly with DUs 103.

Figure 6:
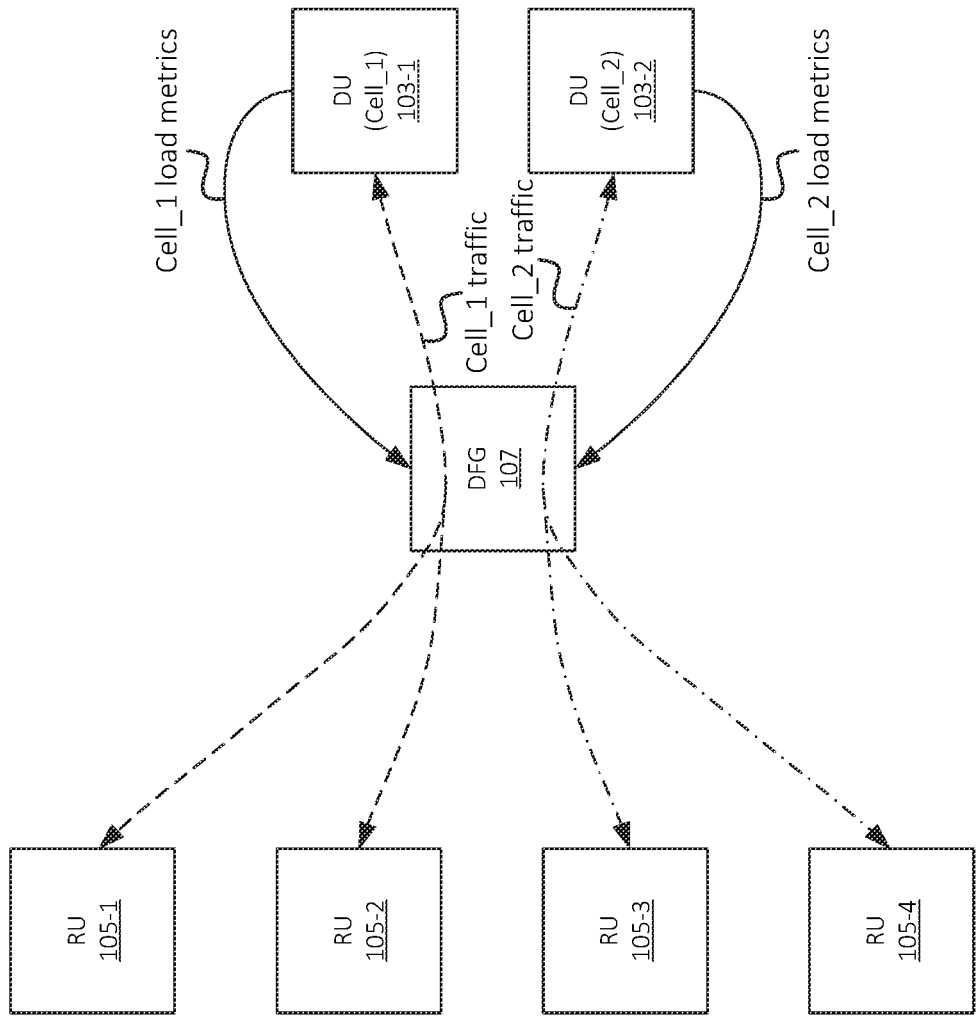
FIG. 6 illustrates an example of monitoring load metrics associated with one or more DUs, in accordance with some embodiments.

During the course of forwarding uplink and/or downlink traffic, DFG 107 may receive load metrics and/or other metrics associated with such traffic. Load metrics may include information such as amount of uplink and/or downlink throughput associated with a given DU 103 (e.g., a given cell) over a particular timeframe, a quantity of UEs connected to one or more RUs 105 with which DU 103 is associated, and/or any other suitable information that is available to DU 103. Additionally, or alternatively, DFG 107 may some or all of the load metrics from some other source, such as a device or system that monitors load metrics associated with respective cells (e.g., where such device or system may be communicatively coupled to DU 103), a RAN controller, or other suitable source. For example, in some embodiments and as shown in FIG. 6, DFG 107 may receive load metrics associated with each of DUs 103-1 and 103-2.

Figure 7:
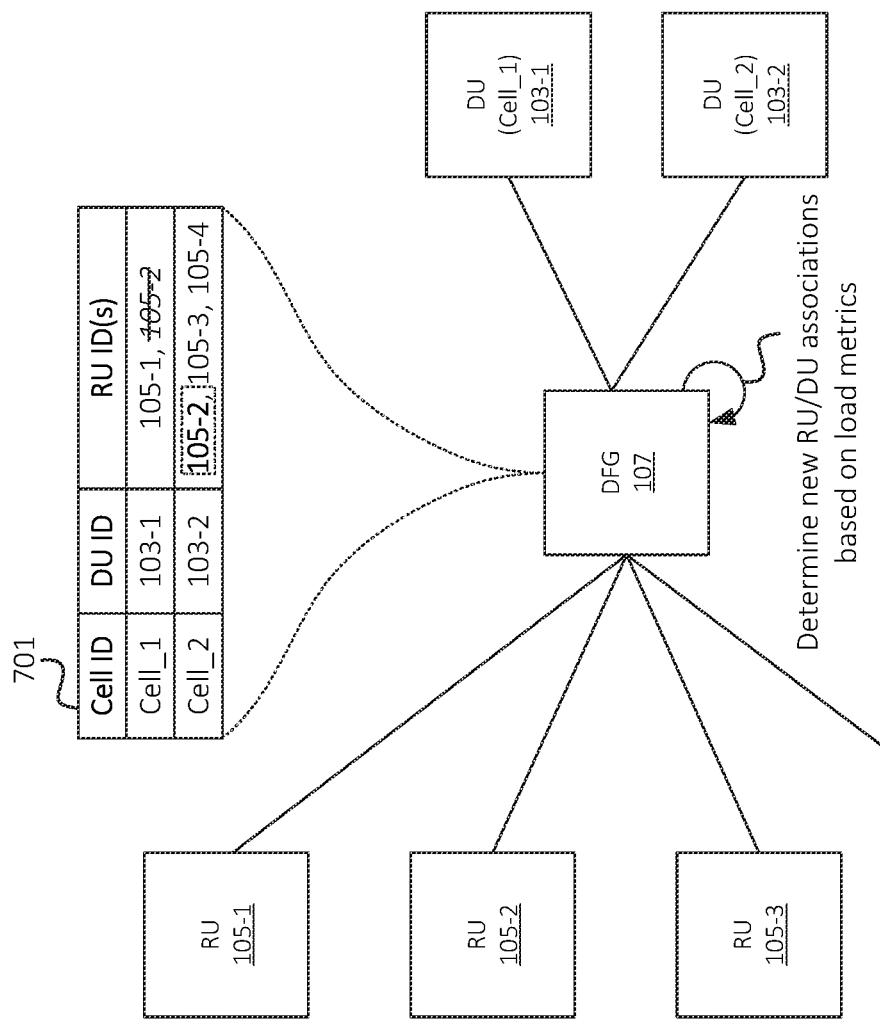
FIGS. 7 and 8 illustrate an example reassignment of cells, RUs, and/or DUs, in accordance with some embodiments.

In some embodiments, as shown in FIG. 7, DFG 107 may determine a new set of associations between DUs 103, RUs 105, and/or cells, based on the received load metrics and/or based on one or more other suitable factors. For example, DFG 107 may determine that one DU (e.g., DU 103-1) is relatively more loaded than another DU (e.g., DU 103-2). DFG 107 may maintain updated data structure 701, which may reflect updates to data structure 201, such as the new set of associations between Cell_1, DU 103-1, and RU 105-1; and Cell_2, DU 103-2, and RUs 105-2 through 105-4. DFG 107 may also provide, to DUs 103-1 and/or 103-2, an indication of the reassignment. For example, DFG 107 may communicate with DUs 103-1 and 103-2 via one or more APIs, protocols, interfaces (e.g., an enhanced or augmented version of an M-plane interface), etc. via which DFG 107 may indicate the reassignment. In this manner, DUs 103-1 and 103-2 may maintain up-to-date information regarding which respective RUs 105 are associated with DUs 103-1 and 103-2. Additionally, or alternatively, DFG 107 may communicate with some other device or system, such as an orchestration platform, a RAN controller, etc., indicating the reassignment. Such other device or system may, in some embodiments, communicate with DUs 103-1 and 103-2 to indicate the reassignment.

Figure 8:
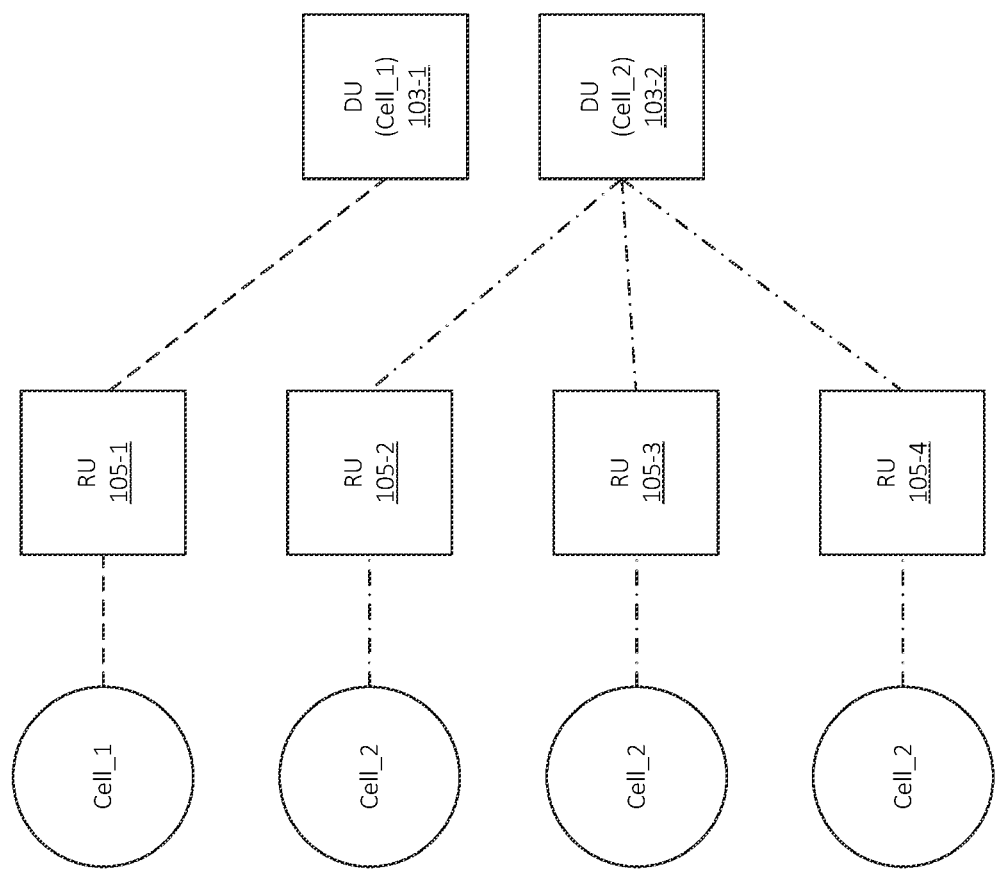

The "relatively more load" mentioned above may refer to, for example, an amount of uplink and/or downlink throughput processed by (e.g., sent to and/or received from) DUs 103-1 and 103-2. The load on DUs 103 may be a factor based on which DFG 107 may reassign RUs 105 to different DUs 103, as DUs 103 may have finite processing resources. In this manner, reassigning an RU (e.g., RU 105-2, in this example) from DU 103-1 to DU 103-2 (e.g., as shown in FIG. 8) may result in less traffic being processed by DU 103-1. That is, prior to the reassignment, DU 103-1 may have processed traffic associated with UEs 109 that were connected to RUs 105-1 and 105-2. After the reassignment, DU 103-1 may process traffic associated with RU 105-1 (e.g., fewer RUs 105 than prior to the reassignment).

DFG 107 may have selected DU 103-2 based on DU 103-2 being the relatively least loaded DU 103 out of a set of candidate DUs 103 (e.g., in situations where DUs 103-1 and 103-2 are two DUs 103 out of a group of multiple DUs 103). Additionally, or alternatively, DFG 107 may have selected DU 103-2 based on DU 103-2 being associated with less than a threshold measure of load. In this manner, the addition of RU 105-2 to DU 103-2 may be performed such that DU 103-2 does not become overloaded based on the addition. In some embodiments, DFG 107 may select DU 103-2 for the reassignment of RU 105-2 based on one or more other factors. In some embodiments, DFG 107 may utilize AI/ML techniques or other suitable modeling techniques in order to determine that DU 103-1 is overloaded (and therefore that one or more RUs 105 associated with DU 103-1 should be reassigned), to determine that DU 103-2 is a candidate for RU 105-2 to be reassigned, to select RU 105-2 for reassignment (e.g., as opposed to selecting RU 105-1), to determine a time at which the reassignment should take effect and/or a duration for which the reassignment should take effect, and/or other to perform other suitable operations.

Figure 9:
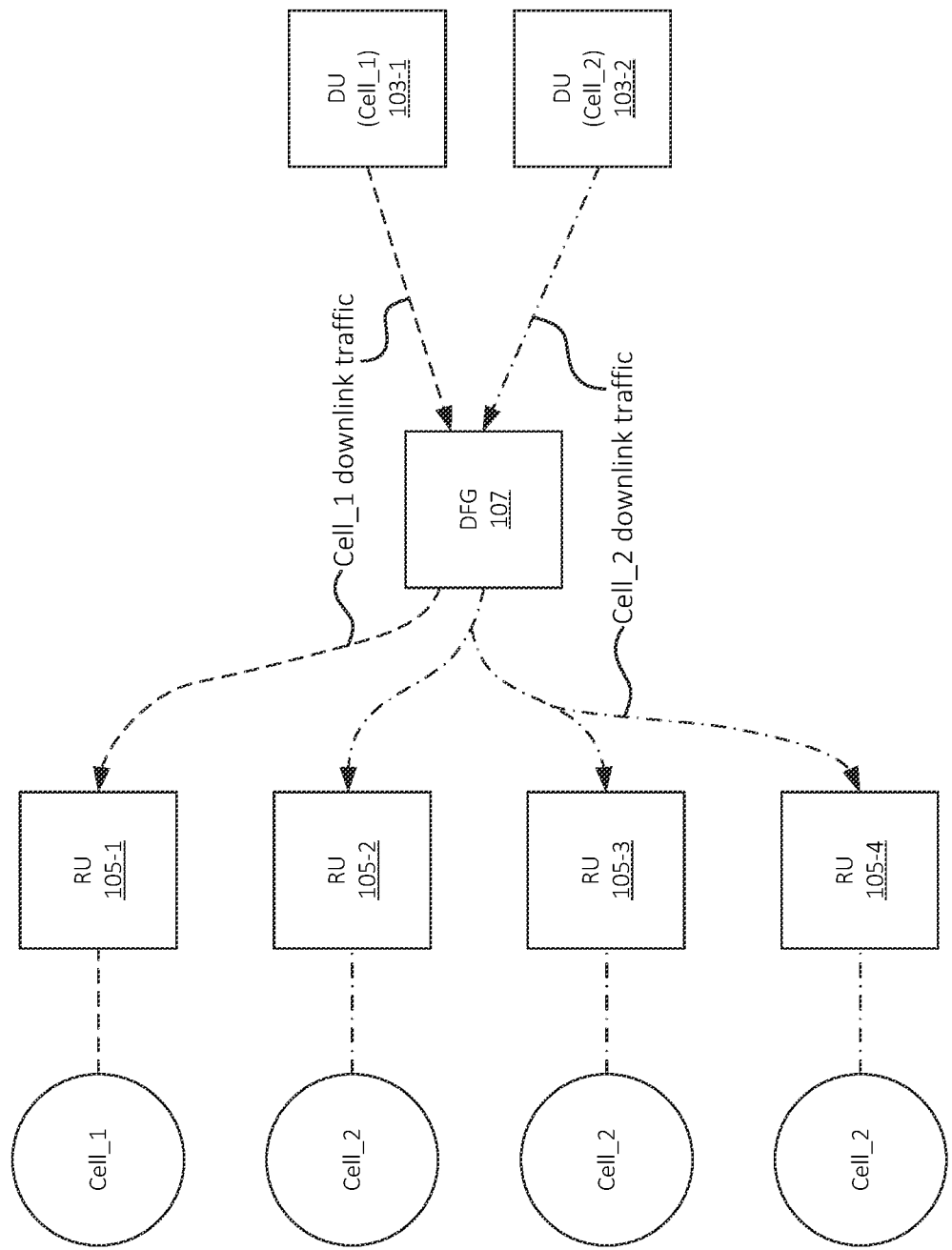
FIGS. 9 and 10 illustrate an example of forwarding uplink and downlink traffic between respective RUs and DUs after reassigning one or more RUs, in accordance with some embodiments
Figure 10:
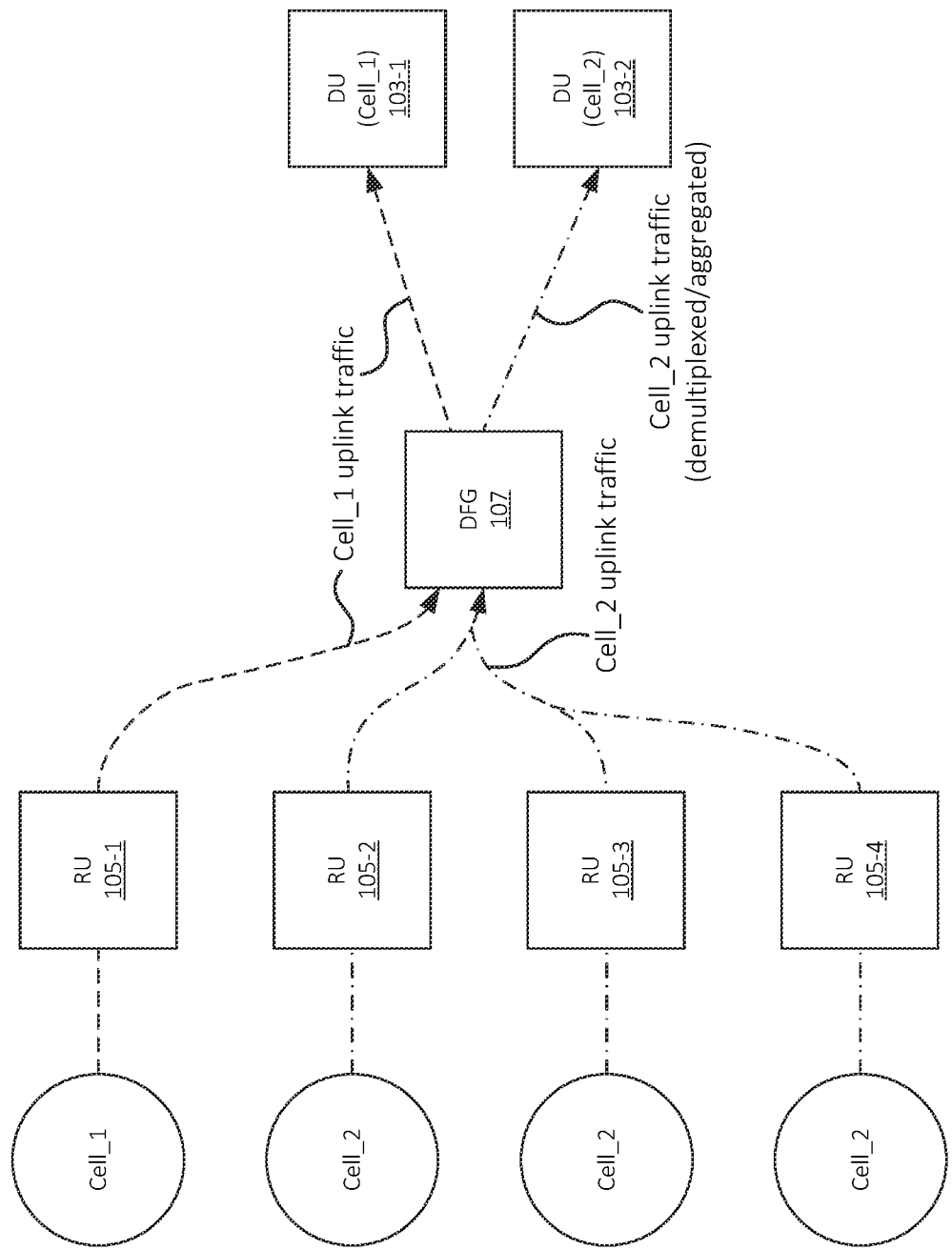

FIGS. 9 and 10 illustrate the example processing, routing, forwarding, etc. of downlink and uplink traffic, respectively, after the reassignment. For example, as shown in FIG. 9, DFG 107 may forward Cell_1 downlink traffic (e.g., traffic received from DU 103-1) to RU 105-1, and may forward Cell_2 downlink traffic to RUs 105-2 through 105-4. Similarly, as shown in FIG. 10, DFG 107 may forward Cell_1 uplink traffic, received from RU 105-1, to DU 103-1. Additionally, DFG 107 may forward Cell_2 uplink traffic, received from RUs 105-2 through 105-4, to DU 103-2.

Figure 11:
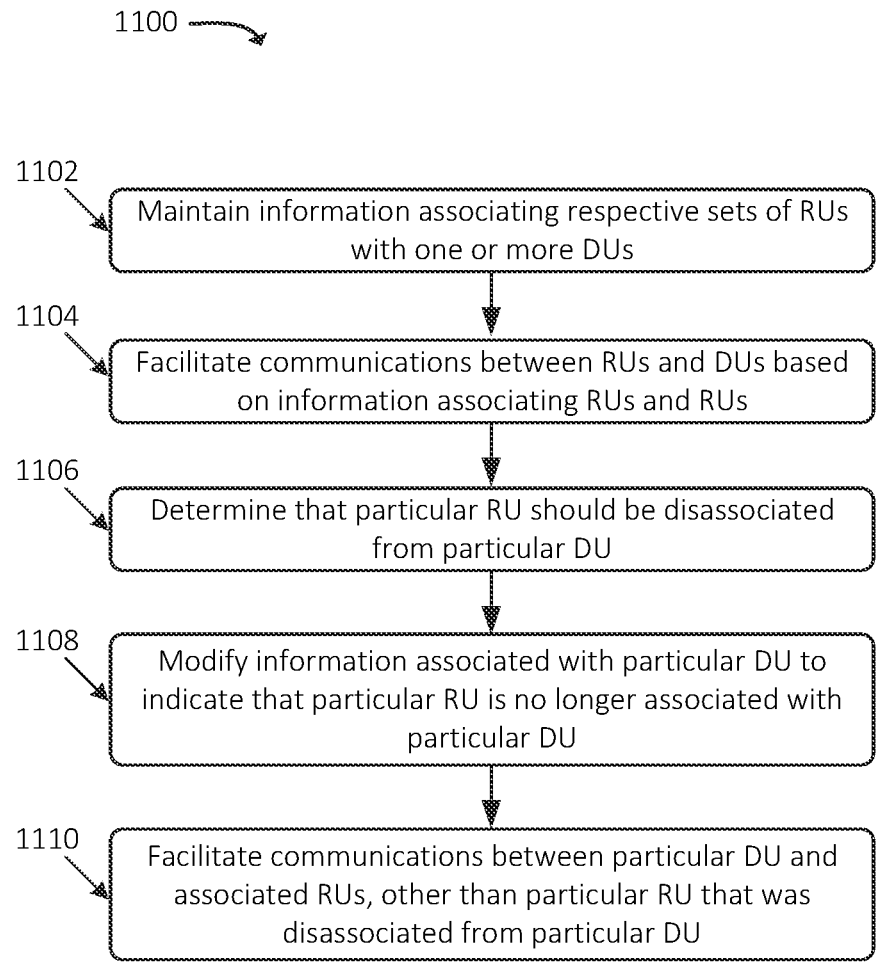
FIG. 11 illustrates an example process for facilitating communications between DUs and associated sets of RUs, as well as the reassignment of one or more such RUs, in accordance with some embodiments.

FIG. 11 illustrates an example process 1100 for facilitating communications between DUs 103 and associated sets of RUs 105, as well as the disassociation, reassignment, etc. of one or more such RUs 105. In some embodiments, some or all of process 1100 may be performed by DFG 107. In some embodiments, one or more other devices may perform some or all of process 1100 in concert with, and/or in lieu of, DFG 107.

As shown, process 1100 may include maintaining (at 1102) information associating respective sets of RUs 105 with one or more DUs 103. For example, as discussed above, DFG 107 may maintain data structure 201 or other suitable information associating one or more DUs 103 with one or more RUs 105 with which such DUs 103 are respectively associated. DFG 107 may receive such information directly from DUs 103, such as via one or more APIs or other suitable protocols associated with DFG 107. For example, DUs 103 may provide one or more configuration files or other suitable information maintained by DUs 103, indicating particular RUs 105 with which such DUs 103 are respectively associated. As discussed above, DFG 107 may receive such information from some other source.

Process 1100 may further include facilitating (at 1104) communications between the RUs 105 and DUs 103. For example, as discussed above, DFG 107 may use the association information (e.g., as maintained in data structure 201) to forward downlink traffic, received from DUs 103, to RUs 105 with which DUs 103 are each respectively associated. Generally, every RU 105 with which the particular DU 103 is associated may be a "copy" or instance of a cell implemented by or otherwise associated with the particular DU 103. As also discussed above, DFG 107 may use the association information to de-multiplex, combine, aggregate, etc. uplink traffic received from multiple RUs 105 associated with a particular DU 103, and forward the de-multiplexed, combined, etc. traffic to the particular DU 103.

Process 1100 may additionally include determining (at 1106) that a particular RU 105 should be disassociated from a particular DU 103. For example, as discussed above, DFG 107 may receive load metrics associated with one or more DUs 103, either via direct communications with such DUs 103 and/or from some other source (e.g., a traffic monitoring system, a RAN controller, etc.). DFG 107 may determine that load metrics associated with the particular DU 103 exceed one or more thresholds. Additionally, or alternatively, DFG 107 may determine that the particular DU 103 is relatively more loaded than one or more other DUs 103. Additionally, or alternatively, DFG 107 may receive an instruction or other information from some other source, indicating that the particular RU 105 should be disassociated from the particular DU 103. Generally, disassociating the particular RU 105 from the particular DU 103 may reduce the load (e.g., the processing load, network throughput load, etc.) on the particular DU 103.

In some embodiments, different DUs 103 may be associated with different load thresholds, which may be based on hardware resource capacity of the different DUs 103 and/or based on other factors. DFG 107 may receive or maintain information indicating the different load thresholds or hardware resource capacities of the different DUs 103, and may dynamically determine for each DU 103 whether such DUs 103 are overloaded, underutilized, etc.

In some embodiments, DFG 107 may select the particular RU 105 for disassociation, from a group of RUs 105 associated with the particular DU 103, based on a measure of load associated with the particular DU 103 and/or measures of load associated with the group of RUs 105. For example, DFG 107 may select the particular RU 105 based on the particular RU 105 having a measure of load that is closest to an overage of the measure of load of the particular DU 103 as compared to the threshold measure of load. In this manner, the particular DU 103 may maintain a relatively high measure of utilization (e.g., load being relatively close to the capacity of the particular DU 103), without exceeding a load threshold. Additionally, or alternatively, DFG 107 may select the particular RU 105 based on the particular RU 105 having a highest measure of load of the group of RUs 105, having a lowest measure of load of the group of RUs 105, and/or in some other suitable manner or based on some other criteria.

Process 1100 may also include modifying (at 1108) information associated with the particular DU 103 to indicate that the particular RU 105 is no longer associated with the particular DU 103. Referring to the examples above, DFG 107 may modify data structure 201, thus resulting in modified data structure 701, indicating that the particular DU 103 is no longer associated with the particular RU 105.

Process 1100 may further include facilitating (at 1110) communications between the particular DU 103 and associated RUs 105. Since the particular RU 105 was disassociated (at 1108) from the particular DU 103, facilitating the communications to and from the particular DU 103 may include forgoing facilitating communications between the particular DU 103 and the particular RU 105. For example, DFG 107 may forward downlink traffic, received from the particular DU 103, to RUs 105 indicated in the modified information (e.g., data structure 701), without forwarding such traffic to the particular RU 105 that was disassociated from the particular DU 103.

In some embodiments, in conjunction with or subsequent to the disassociating of the particular RU 105 from the particular DU 103, DFG 107 may associate the particular RU 105 to one or more other DUs 103. For example, DFG 107 may identify another DU 103 that is underutilized (e.g., associated with a measure of load below one or more thresholds) or that can otherwise handle or accommodate additional traffic that would be handled by such DU 103 based on the assignment of the particular RU 105. In this manner, DFG 107 may maintain network efficiency and utilization without exceeding load metrics associated with DUs 103. Further, as discussed above, DFG 107 may be able to communicate with "off the shelf" DUs 103 and/or RUs 105, thereby providing flexibility in network configuration and deployment, as well as interoperating with existing systems.

Figure 12:
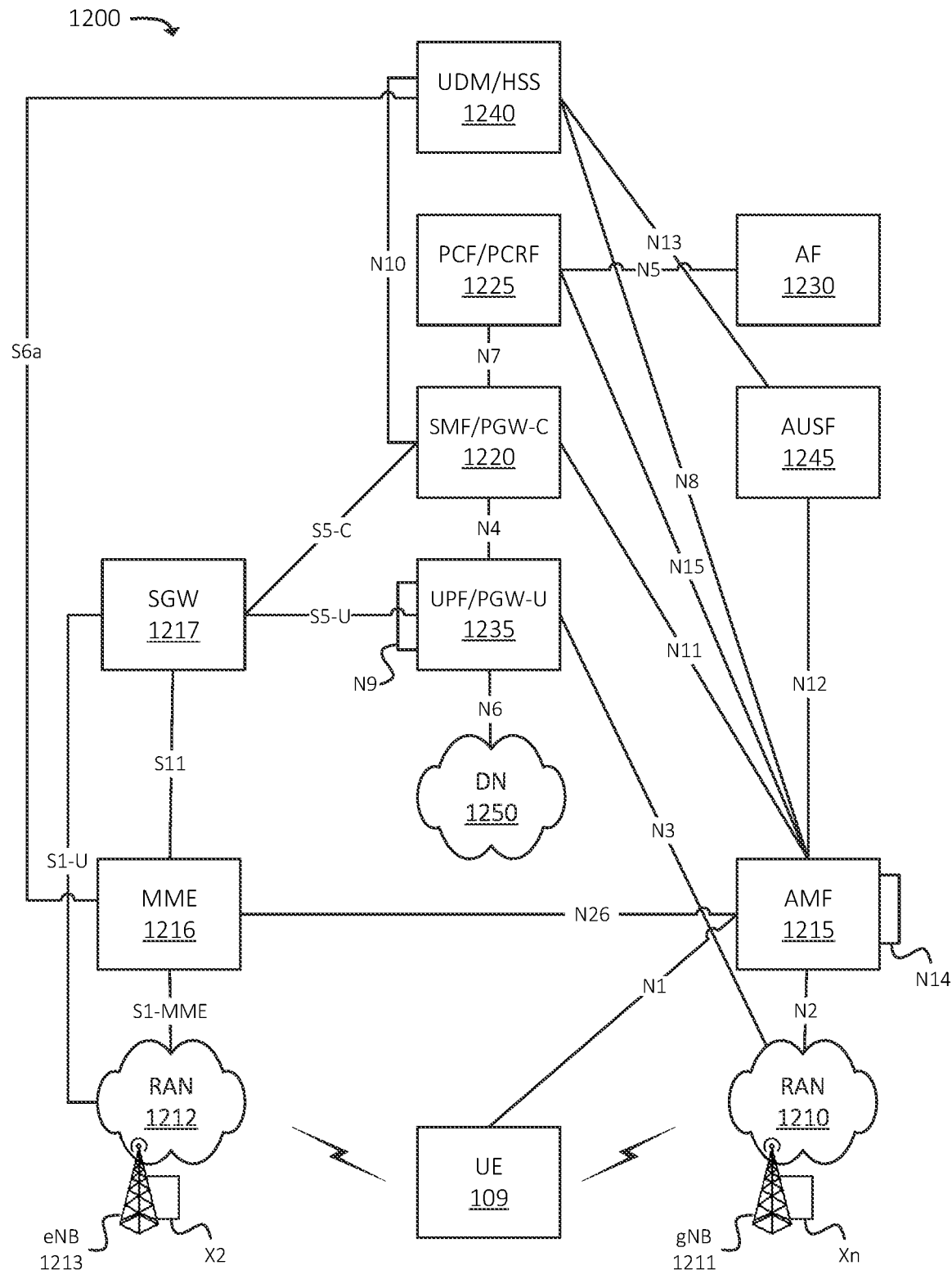
FIG. 12 illustrates an example environment in which one or more embodiments, described herein, may be implemented.

FIG. 12 illustrates an example environment 1200, in which one or more embodiments may be implemented. In some embodiments, environment 1200 may correspond to a Fifth Generation ("5G") network, and/or may include elements of a 5G network. In some embodiments, environment 1200 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 1200 may represent or may include a 5G core ("5GC"). As shown, environment 1200 may include UE 109, RAN 1210 (which may include one or more Next Generation Node Bs ("gNBs") 1211), RAN 1212 (which may include one or more evolved Node Bs ("eNBs") 1213), and various network functions such as AMF 1215, Mobility Management Entity ("MME") 1216, SGW 1217, Session Management Function ("SMF")/Packet Data Network ("PDN") Gateway ("PGW")-Control plane function ("PGW-C") 1220, Policy Control Function ("PCF")/Policy Charging and Rules Function ("PCRF") 1225, Application Function ("AF") 1230, UPF/PGW-User plane function ("PGW-U") 1235, Unified Data Management ("UDM")/Home Subscriber Server ("HSS") 1240, and Authentication Server Function ("AUSF") 1245. In some embodiments, RANs 1210 and/or 1212 may be, may include, may be implemented by, and/or may otherwise between associated with RAN 100. Environment 1200 may also include one or more networks, such as Data Network ("DN") 1250. Environment 1200 may include one or more additional devices or systems communicatively coupled to one or more networks (e.g., DN 1250).

The example shown in FIG. 12 illustrates one instance of each network component or function (e.g., one instance of SMF/PGW-C 1220, PCF/PCRF 1225, UPF/PGW-U 1235, UDM/HSS 1240, and/or AUSF 1245). In practice, environment 1200 may include multiple instances of such components or functions. For example, in some embodiments, environment 1200 may include multiple "slices" of a core network, where each slice includes a discrete and/or logical set of network functions (e.g., one slice may include a first instance of SMF/PGW-C 1220, PCF/PCRF 1225, UPF/PGW-U 1235, UDM/HSS 1240, and/or AUSF 1245, while another slice may include a second instance of SMF/PGW-C 1220, PCF/PCRF 1225, UPF/PGW-U 1235, UDM/HSS 1240, and/or AUSF 1245). The different slices may provide differentiated levels of service, such as service in accordance with different Quality of Service ("QoS") parameters.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, while not shown, environment 1200 may include devices that facilitate or enable communication between various components shown in environment 1200, such as routers, modems, gateways, switches, hubs, etc. Alternatively, or additionally, one or more of the devices of environment 1200 may perform one or more network functions described as being performed by another one or more of the devices of environment 1200. Devices of environment 1200 may interconnect with each other and/or other devices via wired connections, wireless connections, or a combination of wired and wireless connections. In some implementations, one or more devices of environment 1200 may be physically integrated in, and/or may be physically attached to, one or more other devices of environment 1200.

UE 109 may include a computation and communication device, such as a wireless mobile communication device that is capable of communicating with RAN 1210, RAN 1212, and/or DN 1250. UE 109 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 109 may send traffic to and/or receive traffic (e.g., user plane traffic) from DN 1250 via RAN 1210, RAN 1212, and/or UPF/PGW-U 1235.

RAN 1210 may be, or may include, a 5G RAN that includes one or more base stations (e.g., one or more gNBs 1211), via which UE 109 may communicate with one or more other elements of environment 1200. UE 109 may communicate with RAN 1210 via an air interface (e.g., as provided by gNB 1211). For instance, RAN 1210 may receive traffic (e.g., voice call traffic, data traffic, messaging traffic, signaling traffic, etc.) from UE 109 via the air interface, and may communicate the traffic to UPF/PGW-U 1235, and/or one or more other devices or networks. Similarly, RAN 1210 may receive traffic intended for UE 109 (e.g., from UPF/PGW-U 1235, AMF 1215, and/or one or more other devices or networks) and may communicate the traffic to UE 109 via the air interface.

RAN 1212 may be, or may include, a LTE RAN that includes one or more base stations (e.g., one or more eNBs 1213), via which UE 109 may communicate with one or more other elements of environment 1200. UE 109 may communicate with RAN 1212 via an air interface (e.g., as provided by eNB 1213). For instance, RAN 1212 may receive traffic (e.g., voice call traffic, data traffic, messaging traffic, signaling traffic, etc.) from UE 109 via the air interface, and may communicate the traffic to UPF/PGW-U 1235, and/or one or more other devices or networks. Similarly, RAN 1212 may receive traffic intended for UE 109 (e.g., from UPF/PGW-U 1235, SGW 1217, and/or one or more other devices or networks) and may communicate the traffic to UE 109 via the air interface.

AMF 1215 may include one or more devices, systems, Virtualized Network Functions ("VNFs"), Cloud-Native Network Functions ("CNFs"), etc., that perform operations to register UE 109 with the 5G network, to establish bearer channels associated with a session with UE 109, to hand off UE 109 from the 5G network to another network, to hand off UE 109 from the other network to the 5G network, manage mobility of UE 109 between RANs 1210 and/or gNBs 1211, and/or to perform other operations. In some embodiments, the 5G network may include multiple AMFs 1215, which communicate with each other via the N14 interface (denoted in FIG. 12 by the line marked "N14" originating and terminating at AMF 1215).

MME 1216 may include one or more devices, systems, VNFs, CNFs, etc., that perform operations to register UE 109 with the EPC, to establish bearer channels associated with a session with UE 109, to hand off UE 109 from the EPC to another network, to hand off UE 109 from another network to the EPC, manage mobility of UE 109 between RANs 1212 and/or eNBs 1213, and/or to perform other operations.

SGW 1217 may include one or more devices, systems, VNFs, CNFs, etc., that aggregate traffic received from one or more eNBs 1213 and send the aggregated traffic to an external network or device via UPF/PGW-U 1235. Additionally, SGW 1217 may aggregate traffic received from one or more UPF/PGW-Us 1235 and may send the aggregated traffic to one or more eNBs 1213. SGW 1217 may operate as an anchor for the user plane during inter-eNB handovers and as an anchor for mobility between different telecommunication networks or RANs (e.g., RANs 1210 and 1212).

SMF/PGW-C 1220 may include one or more devices, systems, VNFs, CNFs, etc., that gather, process, store, and/or provide information in a manner described herein. SMF/PGW-C 1220 may, for example, facilitate the establishment of communication sessions on behalf of UE 109. In some embodiments, the establishment of communications sessions may be performed in accordance with one or more policies provided by PCF/PCRF 1225.

PCF/PCRF 1225 may include one or more devices, systems, VNFs, CNFs, etc., that aggregate information to and from the 5G network and/or other sources. PCF/PCRF 1225 may receive information regarding policies and/or subscriptions from one or more sources, such as subscriber databases and/or from one or more users (such as, for example, an administrator associated with PCF/PCRF 1225).

AF 1230 may include one or more devices, systems, VNFs, CNFs, etc., that receive, store, and/or provide information that may be used in determining parameters (e.g., quality of service parameters, charging parameters, or the like) for certain applications.

UPF/PGW-U 1235 may include one or more devices, systems, VNFs, CNFs, etc., that receive, store, and/or provide data (e.g., user plane data). For example, UPF/PGW-U 1235 may receive user plane data (e.g., voice call traffic, data traffic, etc.), destined for UE 109, from DN 1250, and may forward the user plane data toward UE 109 (e.g., via RAN 1210, SMF/PGW-C 1220, and/or one or more other devices). In some embodiments, multiple UPFs 1235 may be deployed (e.g., in different geographical locations), and the delivery of content to UE 109 may be coordinated via the N9 interface (e.g., as denoted in FIG. 12 by the line marked "N9" originating and terminating at UPF/PGW-U 1235). Similarly, UPF/PGW-U 1235 may receive traffic from UE 109 (e.g., via RAN 1210, SMF/PGW-C 1220, and/or one or more other devices), and may forward the traffic toward DN 1250. In some embodiments, UPF/PGW-U 1235 may communicate (e.g., via the N4 interface) with SMF/PGW-C 1220, regarding user plane data processed by UPF/PGW-U 1235.

UDM/HSS 1240 and AUSF 1245 may include one or more devices, systems, VNFs, CNFs, etc., that manage, update, and/or store, in one or more memory devices associated with AUSF 1245 and/or UDM/HSS 1240, profile information associated with a subscriber. AUSF 1245 and/or UDM/HSS 1240 may perform authentication, authorization, and/or accounting operations associated with the subscriber and/or a communication session with UE 109.

DN 1250 may include one or more wired and/or wireless networks. For example, DN 1250 may include an Internet Protocol ("IP")-based PDN, a wide area network ("WAN") such as the Internet, a private enterprise network, and/or one or more other networks. UE 109 may communicate, through DN 1250, with data servers, other UEs 109, and/or to other servers or applications that are coupled to DN 1250. DN 1250 may be connected to one or more other networks, such as a public switched telephone network ("PSTN"), a public land mobile network ("PLMN"), and/or another network. DN 1250 may be connected to one or more devices, such as content providers, applications, web servers, and/or other devices, with which UE 109 may communicate.

Figure 13:
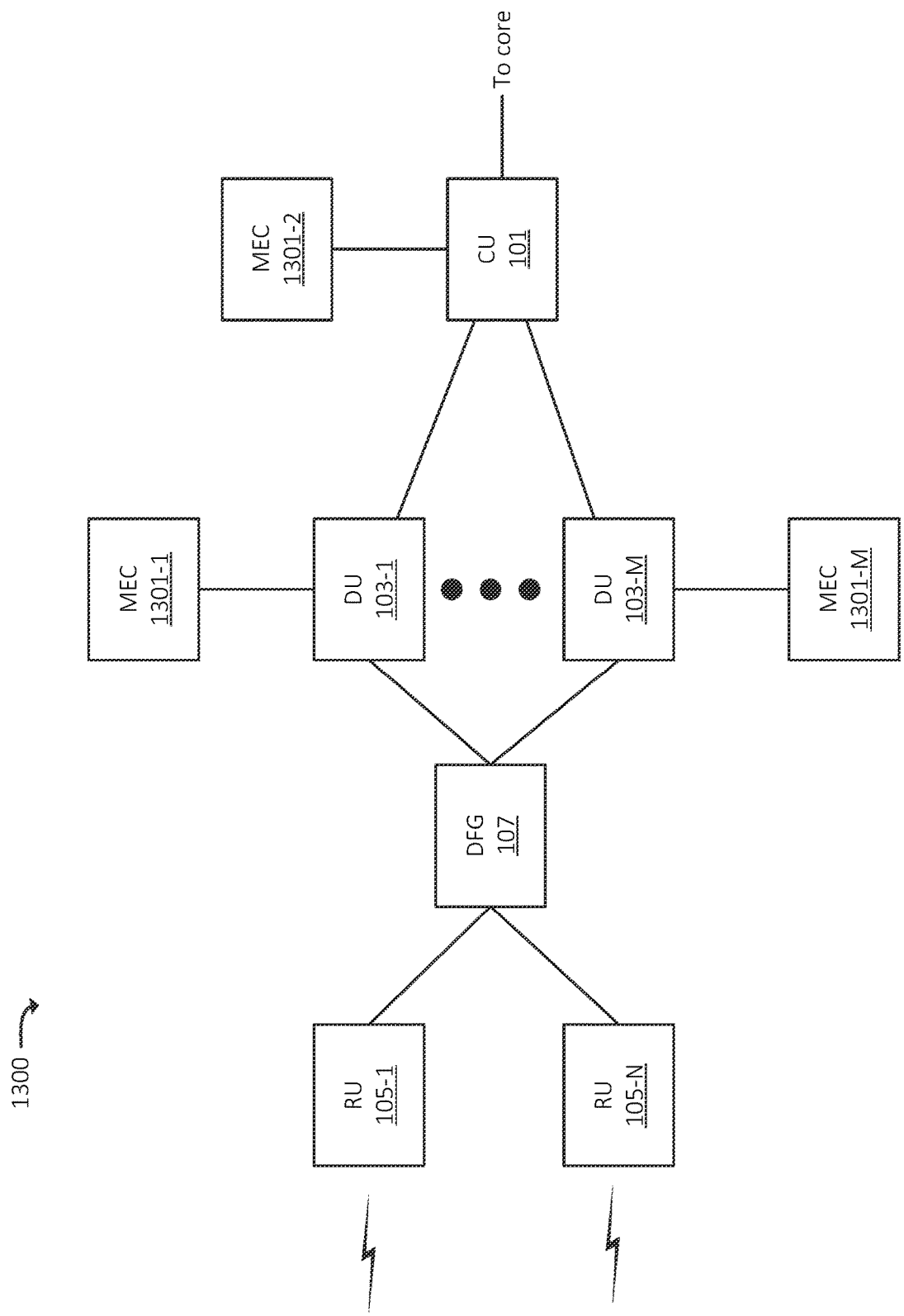
FIG. 13 illustrates an example arrangement of a radio access network ("RAN"), in accordance with some embodiments.

FIG. 13 illustrates an example RAN split environment 1300, which may be included in and/or implemented by one or more RANs (e.g., RAN 1210, RAN 1212, or some other RAN). In some embodiments, a particular RAN may include one RAN split environment 1300. In some embodiments, a particular RAN may include multiple RAN split environments 1300. In some embodiments, RAN split environment 1300 may correspond to a particular gNB 1211 of a 5G RAN (e.g., RAN 1210). In some embodiments, RAN split environment 1300 may correspond to multiple gNBs 1211. In some embodiments, RAN split environment 1300 may correspond to one or more other types of base stations of one or more other types of RANs. As shown, RAN split environment 1300 may include Central Unit ("CU") 101, one or more Distributed Units ("DUs") 103-1 through 103-N (referred to individually as "DU 103," or collectively as "DUs 103"), and one or more Radio Units ("RUs") 105-1 through 105-M (referred to individually as "RU 105," or collectively as "RUs 105").

CU 101 may communicate with a core of a wireless network (e.g., may communicate with one or more of the devices or systems described above with respect to FIG. 12, such as AMF 1215 and/or UPF/PGW-U 1235). In the uplink direction (e.g., for traffic from UEs 109 to a core network), CU 101 may aggregate traffic from DUs 103, and forward the aggregated traffic to the core network. In some embodiments, CU 101 may receive traffic according to a given protocol (e.g., Radio Link Control ("RLC")) from DUs 103, and may perform higher-layer processing (e.g., may aggregate/process RLC packets and generate Packet Data Convergence Protocol ("PDCP") packets based on the RLC packets) on the traffic received from DUs 103.

In accordance with some embodiments, CU 101 may receive downlink traffic (e.g., traffic from the core network) for a particular UE 109, and may determine which DU(s) 103 should receive the downlink traffic. DU 103 may include one or more devices that transmit traffic between a core network (e.g., via CU 101) and UE 109 (e.g., via a respective RU 105). DU 103 may, for example, receive traffic from RU 105 at a first layer (e.g., physical ("PHY") layer traffic, or lower PHY layer traffic), and may process/aggregate the traffic to a second layer (e.g., upper PHY and/or RLC). DU 103 may receive traffic from CU 101 at the second layer, may process the traffic to the first layer, and provide the processed traffic to a respective RU 105 for transmission to UE 109.

RU 105 may include hardware circuitry (e.g., one or more RF transceivers, antennas, radios, and/or other suitable hardware) to communicate wirelessly (e.g., via an RF interface) with one or more UEs 109, one or more other DUs 103 (e.g., via RUs 105 associated with DUs 103), and/or any other suitable type of device. In the uplink direction, RU 105 may receive traffic from UE 109 and/or another DU 103 via the RF interface and may provide the traffic to DU 103. In the downlink direction, RU 105 may receive traffic from DU 103, and may provide the traffic to UE 109 and/or another DU 103. In some embodiments, one or more links between one or more RUs 105 and one or more DUs 103 may include one or more instances of DFG 107, which may route, multiplex, de-multiplex, etc. traffic as appropriate, as discussed above.

One or more elements of RAN split environment 1300 may, in some embodiments, be communicatively coupled to one or more Multi-Access/Mobile Edge Computing ("MEC") devices, referred to sometimes herein simply as "MECs" 1301. For example, DU 103-1 may be communicatively coupled to MEC 1301-1, DU 103-M may be communicatively coupled to MEC 1301-M, CU 101 may be communicatively coupled to MEC 1301-2, and so on. MECs 1301 may include hardware resources (e.g., configurable or provisionable hardware resources) that may be configured to provide services and/or otherwise process traffic to and/or from UE 109, via a respective RU 105.

For example, DU 103-1 may route some traffic, from UE 109, to MEC 1301-1 instead of to core network 111 via CU 101. MEC 1301-1 may process the traffic, perform one or more computations based on the received traffic, and may provide traffic to UE 109 via RU 105-1. In some embodiments, MEC 1301 may include, and/or may implement, some or all of the functionality described above with respect to AF 1230, UPF 1235, DFG 107, and/or one or more other devices, systems, VNFs, CNFs, etc. In this manner, ultra-low latency services may be provided to UE 109, as traffic does not need to traverse DU 103, CU 101, links between DU 103 and CU 101, and/or an intervening backhaul network between RAN split environment 1300 and core network 111.

Figure 14:
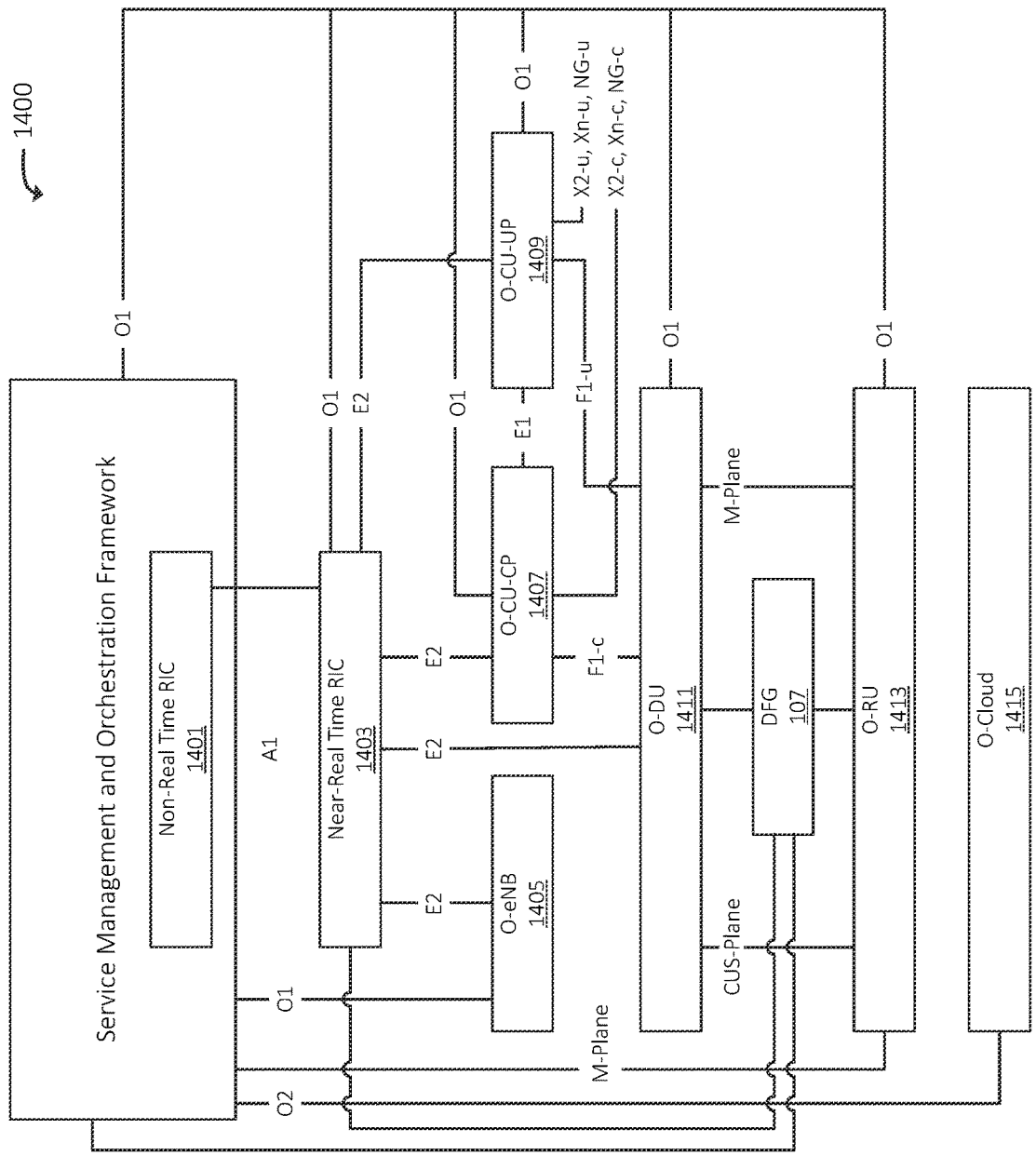
FIG. 14 illustrates an example arrangement of an Open RAN ("O-RAN") environment in which one or more embodiments, described herein, may be implemented.

FIG. 14 illustrates an example O-RAN environment 1400, which may correspond to RAN 1210, RAN 1212, and/or RAN split environment 1300. For example, RAN 1210, RAN 1212, and/or RAN split environment 1300 may include one or more instances of O-RAN environment 1400, and/or one or more instances of O-RAN environment 1400 may implement RAN 1210, RAN 1212, RAN split environment 1300, and/or some portion thereof. As shown, O-RAN environment 1400 may include Non-Real Time Radio Intelligent Controller ("RIC") 1401, Near-Real Time RIC 1403, O-eNB 1405, O-CU-Control Plane ("O-CU-CP") 1407, O-CU-User Plane ("O-CU-UP") 1409, O-DU 1411, O-RU 1413, and O-Cloud 1415. In some embodiments, O-RAN environment 1400 may include additional, fewer, different, and/or differently arranged components, such as DFG 107.

In some embodiments, some or all of the elements of O-RAN environment 1400 may be implemented by one or more configurable or provisionable resources, such as virtual machines, cloud computing systems, physical servers, and/or other types of configurable or provisionable resources. In some embodiments, some or all of O-RAN environment 1400 may be implemented by, and/or communicatively coupled to, one or more MECs 1301.

Non-Real Time MC 1401 and Near-Real Time MC 1403 may receive performance information (and/or other types of information) from one or more sources, and may configure other elements of O-RAN environment 1400 based on such performance or other information. For example, Near-Real Time RIC 1403 may receive performance information, via one or more E2 interfaces, from O-eNB 1405, O-CU-CP 1407, and/or O-CU-UP 1409, and may modify parameters associated with O-eNB 1405, O-CU-CP 1407, O-CU-UP 1409, and/or DFG 107 based on such performance information. Similarly, Non-Real Time RIC 1401 may receive performance information associated with O-eNB 1405, O-CU-CP 1407, O-CU-UP 1409, and/or one or more other elements of O-RAN environment 1400 and may utilize machine learning and/or other higher level computing or processing to determine modifications to the configuration of O-eNB 1405, O-CU-CP 1407, O-CU-UP 1409, DFG 107, and/or other elements of O-RAN environment 1400. In some embodiments, Non-Real Time RIC 1401 may generate machine learning models based on performance information associated with O-RAN environment 1400 or other sources, and may provide such models to Near-Real Time RIC 1403 for implementation.

O-eNB 1405 may perform functions similar to those described above with respect to eNB 1213. For example, O-eNB 1405 may facilitate wireless communications between UE 109 and core network 111. O-CU-CP 1407 may perform control plane signaling to coordinate the aggregation and/or distribution of traffic via one or more DUs 103, which may include and/or be implemented by one or more O-DUs 1411, and O-CU-UP 1409 may perform the aggregation and/or distribution of traffic via such DUs 103 (e.g., O-DUs 1411). O-DU 1411 may be communicatively coupled to one or more RUs 105, which may include and/or may be implemented by one or more O-RUs 1413. In some embodiments, O-Cloud 1415 may include or be implemented by one or more MECs 1301, which may provide services, and may be communicatively coupled, to O-CU-CP 1407, O-CU-UP 1409, O-DU 1411, and/or O-RU 1413 (e.g., via an O1 and/or O2 interface).

In some embodiments, DU 103 may include, may be implemented by, and/or may otherwise be associated with O-DU 1411. In some embodiments, RU 105 may include, may be implemented by, and/or may otherwise be associated with O-RU 1413. As such, in some embodiments, DFG 107 may serve as an interface between, and/or may otherwise facilitate communications between, one or more O-DUs 1411 and one or more O-RUs 1413 in a manner similar to that described above. Additionally, or alternatively, one or more O-DUs 1411 may communicate with one or more O-RUs 1413 via one or more other interfaces or communication pathways that do not include DFG 107.

Figure 15:
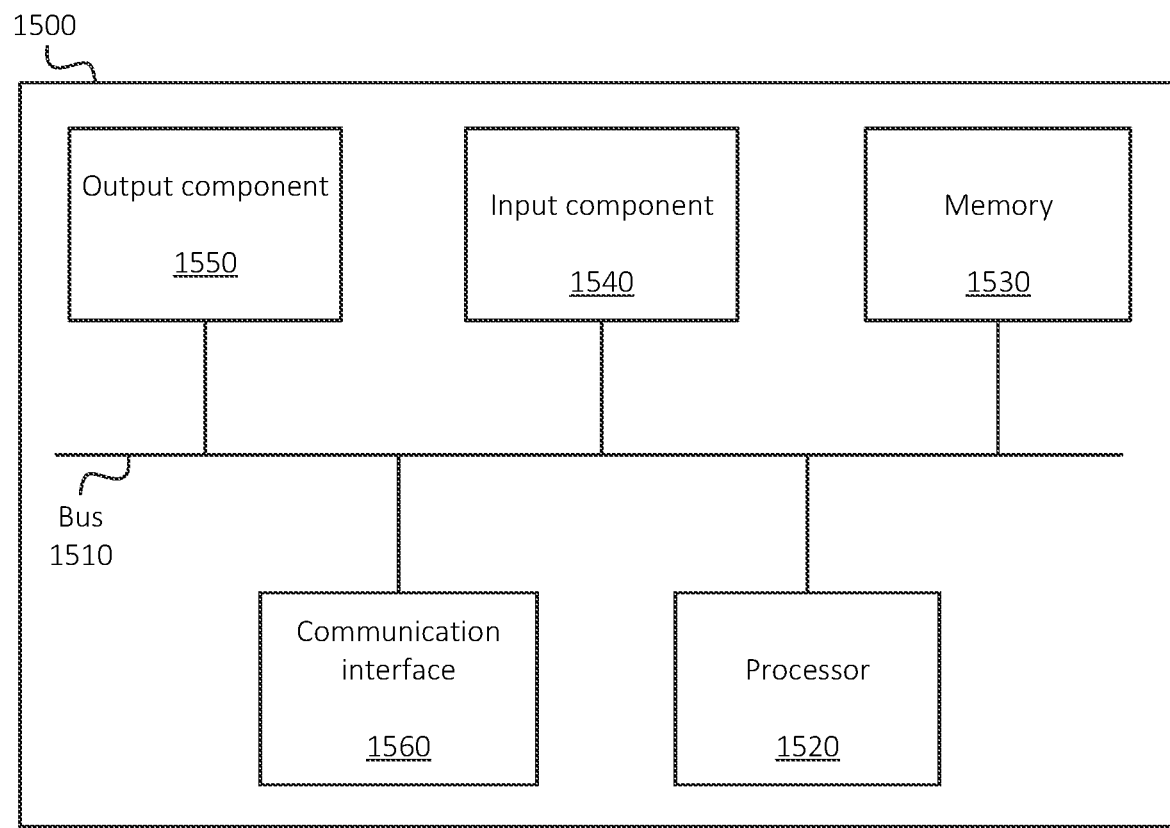
FIG. 15 illustrates example components of one or more devices, in accordance with one or more embodiments described herein.

FIG. 15 illustrates example components of device 1500. One or more of the devices described above may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. In some embodiments, processor 1520 may be or may include one or more hardware processors. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500 and/or other receives or detects input from a source external to 1540, such as a touchpad, a touchscreen, a keyboard, a keypad, a button, a switch, a microphone or other audio input component, etc. In some embodiments, input component 1540 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   maintain information associating a first set of Radio Units ("RUs") of a wireless network with a particular Distributed Unit ("DU") of the wireless network, wherein the first set of RUs includes a particular RU;
   facilitate communications between the first set of RUs and the particular DU based on the information associating the first set of RUs with the particular DU;
   determine that the particular RU should be disassociated from the particular DU;
   modify, based on determining that the particular RU should be disassociated from the particular DU, the information associating the first set of RUs with the particular DU, wherein the modified information indicates a second set of RUs which does not include the particular RU; and
   facilitate communications between the second set of RUs and the particular DU based on the modified information associating the second set of RUs with the particular DU.

2. The device of claim 1, wherein the particular DU performs baseband processing on traffic that is sent to or received from the first and second sets of RUs.

3. The device of claim 1, wherein facilitating the communications between the first set of RUs and the particular DU includes:
   receiving downlink traffic from the particular DU;
   identifying, based on the information associating the first set of RUs with the particular DU, that the downlink traffic from the particular DU is associated with the first set of RUs; and
   forwarding the received downlink traffic to the first set of RUs based on identifying that the downlink traffic from the particular DU is associated with the first set of RUs.

4. The device of claim 3, wherein the first set of RUs each wirelessly transmit at least a portion of the downlink traffic to one or more User Equipment ("UEs") that are connected to respective RUs of the first set of RUs.

5. The device of claim 1, wherein facilitating the communications between the first set of RUs and the particular DU includes:
  receiving uplink traffic from the first set of RUs;
  performing a de-multiplexing operation on the uplink traffic; and
  providing the de-multiplexed uplink traffic to the particular DU.

6. The device of claim 5, wherein the one or more processors are further configured to:
  receive uplink traffic from another RU that is not in the first set of RUs; and
  forgo providing the uplink traffic received from the other RU to the particular DU, based on the other RU not being indicated in the first set of RUs.

7. The device of claim 1, wherein the one or more processors are further configured to:
  determine that a measure of load associated with the particular DU exceeds one or more threshold measures of load,
  wherein determining that the particular RU should be disassociated from the particular DU is based on determining that the measure of load associated with the particular DU exceeds the one or more threshold measures of load.

8. A non-transitory computer-readable medium, storing a plurality of processor-executable instructions to:
  maintain information associating a first set of Radio Units ("RUs") of a wireless network with a particular Distributed Unit ("DU") of the wireless network, wherein the first set of RUs includes a particular RU;
  facilitate communications between the first set of RUs and the particular DU based on the information associating the first set of RUs with the particular DU;
  determine that the particular RU should be disassociated from the particular DU;
  modify, based on determining that the particular RU should be disassociated from the particular DU, the information associating the first set of RUs with the particular DU, wherein the modified information indicates a second set of RUs which does not include the particular RU; and
  facilitate communications between the second set of RUs and the particular DU based on the modified information associating the second set of RUs with the particular DU.

9. The non-transitory computer-readable medium of claim 8, wherein the particular DU performs baseband processing on traffic that is sent to or received from the first and second sets of RUs.

10. The non-transitory computer-readable medium of claim 8, wherein facilitating the communications between the first set of RUs and the particular DU includes:
  receiving downlink traffic from the particular DU;
  identifying, based on the information associating the first set of RUs with the particular DU, that the downlink traffic from the particular DU is associated with the first set of RUs; and
  forwarding the received downlink traffic to the first set of RUs based on identifying that the downlink traffic from the particular DU is associated with the first set of RUs.

11. The non-transitory computer-readable medium of claim 10, wherein the first set of RUs each wirelessly transmit at least a portion of the downlink traffic to one or more User Equipment ("UEs") that are connected to respective RUs of the first set of RUs.

12. The non-transitory computer-readable medium of claim 8, wherein facilitating the communications between the first set of RUs and the particular DU includes:
  receiving uplink traffic from the first set of RUs;
  performing a de-multiplexing operation on the uplink traffic; and
  providing the de-multiplexed uplink traffic to the particular DU.

13. The non-transitory computer-readable medium of claim 12, wherein the plurality of processor-executable instructions further include processor-executable instructions to:
  receive uplink traffic from another RU that is not in the first set of RUs; and
  forgo providing the uplink traffic received from the other RU to the particular DU, based on the other RU not being indicated in the first set of RUs.

14. The non-transitory computer-readable medium of claim 8, wherein the plurality of processor-executable instructions further include processor-executable instructions to:
  determine that a measure of load associated with the particular DU exceeds one or more threshold measures of load,
  wherein determining that the particular RU should be disassociated from the particular DU is based on determining that the measure of load associated with the particular DU exceeds the one or more threshold measures of load.

15. A method, comprising:
  maintaining information associating a first set of Radio Units ("RUs") of a wireless network with a particular Distributed Unit ("DU") of the wireless network, wherein the first set of RUs includes a particular RU;
  facilitating communications between the first set of RUs and the particular DU based on the information associating the first set of RUs with the particular DU;
  determining that the particular RU should be disassociated from the particular DU;
  modifying, based on determining that the particular RU should be disassociated from the particular DU, the information associating the first set of RUs with the particular DU, wherein the modified information indicates a second set of RUs which does not include the particular RU; and
  facilitating communications between the second set of RUs and the particular DU based on the modified information associating the second set of RUs with the particular DU.

16. The method of claim 15, wherein the particular DU performs baseband processing on traffic that is sent to or received from the first and second sets of RUs.

17. The method of claim 15, wherein facilitating the communications between the first set of RUs and the particular DU includes:
  receiving downlink traffic from the particular DU;
  identifying, based on the information associating the first set of RUs with the particular DU, that the downlink traffic from the particular DU is associated with the first set of RUs; and
  forwarding the received downlink traffic to the first set of RUs based on identifying that the downlink traffic from the particular DU is associated with the first set of RUs.

18. The method of claim 15, wherein facilitating the communications between the first set of RUs and the particular DU includes:
  receiving uplink traffic from the first set of RUs;

performing a de-multiplexing operation on the uplink traffic; and providing the de-multiplexed uplink traffic to the particular DU.

19. The method of claim 18, further comprising:

receiving uplink traffic from another RU that is not in the first set of RUs; and forgoing providing the uplink traffic received from the other RU to the particular DU, based on the other RU not being indicated in the first set of RUs.

20. The method of claim 15, further comprising:

determining that a measure of load associated with the particular DU exceeds one or more threshold measures of load, wherein determining that the particular RU should be disassociated from the particular DU is based on determining that the measure of load associated with the particular DU exceeds the one or more threshold measures of load.

* * * * *